(12) United States Patent
Turk

(10) Patent No.: US 6,540,265 B2
(45) Date of Patent: Apr. 1, 2003

(54) FLUID FITTING

(75) Inventor: Victor J. Turk, Elyria, OH (US)

(73) Assignee: R. W. Beckett Corporation, North Ridgeville, OH (US)

( * ) Notice: Subject to any disclaimer, the term of this patent is extended or adjusted under 35 U.S.C. 154(b) by 0 days.

(21) Appl. No.: 09/750,569

(22) Filed: Dec. 28, 2000

(65) Prior Publication Data

US 2002/0084653 A1 Jul. 4, 2002

(51) Int. Cl.⁷ ................................. F16L 25/00
(52) U.S. Cl. .................. 285/384; 285/280; 285/384
(58) Field of Search ....................... 285/280, 353, 285/382.2, 333, 384, 354, 356

(56) References Cited

U.S. PATENT DOCUMENTS

| | | | |
|---|---|---|---|
| 1,768,095 A | * 6/1930 | Arthur | 285/382.2 |
| 1,943,717 A | 1/1934 | Barnes | |
| 2,026,167 A | 12/1935 | Guarnaschelli | |
| 2,496,149 A | 1/1950 | Cahenzli, Jr. | |
| 2,613,958 A | * 10/1952 | Richardson | 285/353 |
| 2,775,471 A | 12/1956 | Douglass | |
| 3,618,987 A | 11/1971 | Carbone | |
| 3,746,376 A | 7/1973 | Gold | |
| 4,029,345 A | 6/1977 | Romanelli | |
| 4,073,512 A | 2/1978 | Vian et al. | |
| 5,052,719 A | * 10/1991 | Boehm | 285/353 |
| 5,088,774 A | * 2/1992 | Spiegelman | 285/384 |
| 5,141,262 A | 8/1992 | Bartholomew | |
| 5,350,205 A | 9/1994 | Aldridge et al. | |
| 5,791,693 A | * 8/1998 | Crawford | 285/354 |

* cited by examiner

Primary Examiner—Lynne H. Browne
Assistant Examiner—Aaron Dunwoody
(74) Attorney, Agent, or Firm—Watts Hoffmann Fisher & Heinke

(57) ABSTRACT

A fluid fitting is provided for connecting two members transmitting a high pressure fluid. The fitting includes an elongated tubular stem, a first connecting member, and a second connecting member. A hydraulic seal may be effected by an interference fit between the second connecting member and the stem. The first connecting member may be a flare nut. The second connecting member may be a plug fitting. The fluid fitting preferably provides a connection between a fuel oil valve and an oil burner nozzle. The valve may be rigidly mounted to the burner nozzle without the use of additional mounting hardware and within a small space adjacent to the burner.

17 Claims, 3 Drawing Sheets

FLUID FITTING

FIELD OF THE INVENTION

This invention relates to fluid fittings, and in particular, to fluid fittings used as a connector to effect a hydraulic seal for transmitting pressurized fluid.

BACKGROUND OF THE INVENTION

Fluid fittings, such as connectors between two members transmitting a fluid, are common and used in many industrial, commercial, and residential applications. The actual fluid transmitted through the connectors, the temperature of the fluid, and the pressure of the fluid are parameters that define the performance characteristics required by a fluid fitting. In certain applications, unique connector assemblies have been developed in the art, while in other applications, conventional hard plumbing connections are used.

Conventional fuel oil burners generally include a fuel supply line. Each fuel supply line is connected at one end to a fuel supply pump and terminates at the other end at a burner inlet nozzle. A valve used to regulate fuel flow is included in the fuel supply line. The fuel oil is typically pumped under relatively high pressures. It is conventional in the prior art to hard plumb the supply line from the fuel oil pump, to the valve, and to the burner inlet nozzle. The plumbing operation uses conventional elbow fittings, threaded fittings, and nipples to effect a sealed supply line. The use of conventional plumbing requires the supply line to transverse space outside the immediate burner proximity.

Conventional burners of this type often are installed within an application environment by an original equipment manufacturer. A design concern for burner suppliers is to limit the volumetric footprint of the burner. The less volume the burner assembly occupies, the more advantageous the burner is to the original equipment manufacturers. Another design concern for connectors of this type is to effect a hydraulic seal at high pressure.

Conventional connectors typically mount the valve at a relative distance away from and above the burner nozzle line. To hard mount the valve, additional mounting hardware parts are required. During the off-cycle of a burner, air tends to gather in the nozzle line of the burner.

The air tends to result in less-reliable burner light-offs and shut-downs.

Another concern with convention plumbing is that in-the-field maintenance requires disassembly of the plumbing connections in order to service the valve or the burner. The disassembly increases maintenance costs and equipment down time.

Thus, there is a need for a connector providing a hydraulic seal for transmitting high pressure fuel oil which allows the hard mounting of a valve without valve mounting parts required, while at the same time minimizing air trapped in a nozzle line, while providing a reduced volumetric footprint attractive to original equipment manufacturers.

SUMMARY OF THE INVENTION

The present invention is directed to a fluid fitting suitable for connecting first and second members that transmit pressurized fluid. The fitting effects a hydraulic seal. In a preferred embodiment, the connector is directed to providing a connection for a fuel oil line leading from a valve to an oil burner. The first member of the connection is a standard flare fitting leading to an inlet nozzle line feeding a burner. The second member is valve including a standard pipe fitting.

The fluid fitting comprises an elongated tubular stem a first connecting member (e.g. a nut), a second connecting member (e.g. a plug), and a hydraulic seal. The elongated tubular stem comprises a first end portion having a first outer diameter, a flange having a second outer diameter and disposed at a second end portion of the stem, and an intermediate portion axially spaced between the first end portion and the flange. The intermediate portion has an outer diameter. A shoulder is disposed between the intermediate portion and the first end portion. An internal fluid passageway extends throughout the stem. The second diameter is larger than the intermediate portion diameter, while the intermediate portion diameter is larger than the first diameter.

The first connecting member comprises an inner opening extending therethrough that receives the intermediate portion of the stem and permits relative rotation between the first connecting member and the stem. An internal abutment surface engages the flange and prevents axial movement of the first connecting member on the stem. A threaded portion is adapted to engage threads of the first member to be connected to the fitting. A polygonal shaped exterior tool engaging surface is included. In a preferred embodiment, the first connecting member is a flare nut sized to engage a standard flare fitting.

The second connecting member comprises an inner opening extending therethrough which receives the first end portion of the stem. A threaded portion is adapted to engage threads of the second member to be connected to the fitting. An abutment face at one end engages the shoulder of the elongated tubular stem. A polygonal shaped exterior tool engaging surface is included. In a preferred embodiment, the second connecting member is a tapered pipe fitting.

The hydraulic seal may be comprised by an internal diameter of the inner opening of the second connecting member and the first diameter of the stem being sized effective to form an interference fit between the second connecting member and the first end portion of the elongated tubular stem.

In a preferred embodiment, the threaded portion of the first connecting member may comprise threads disposed on an internal surface and the threaded portion of the second connecting member comprises threads disposed on an external surface. An axial length of the first end portion of the stem may be longer than an axial length of said second connecting member. A diameter of the second member may be larger than a diameter of the first member, as in the case of an internal diameter of a threaded opening of a valve (second member) which is larger than an external diameter of a threaded nipple on a flare fitting (first member).

The invention also comprises the combination of the valve connector, the valve, and the flare fitting attached to a fuel conduit of a burner.

A method for assembling a fluid fitting assembly, suitable for connecting first and second members that contain pressurized fluid, comprises the first step of providing an elongated tubular stem according to the present invention. A first connecting member according to the present invention is oriented such that the threaded portion of the first connecting member is directed toward the first end portion of the elongated stem. The first connecting member is slipped over the first end portion such that the flange of the elongated tubular stem contacts the internal abutment surface of the first connecting member.

A second connecting member is oriented such that the threaded portion of the second connecting portion is directed away from the first end portion of the elongated stem. The first end portion is inserted into the interior opening of the second connecting member such that the second connecting member contacts the shoulder of the elongated tubular stem.

The threaded portion of said first connecting member is connected to a threaded portion of the first member. The threaded portion of the second connecting member is connected to a threaded portion of the second member.

In a preferred embodiment, the first end portion of the stem is staked onto a tapered end of the second connecting member by the use of a tool.

The present invention offers advantages over connectors available in the prior art. A connector in accordance with the present invention permits a valve to be rigidly mounted to a nozzle line feeding an oil burner without the use of any additional valve mounting hardware. During the off-cycle of a burner, air tends to gather in the nozzle line of the burner. A connector assembled in accordance with the present invention can be rigidly mounted at the height of the nozzle line. Mounting in this location advantageously minimizes air trapped in the nozzle line. Further, the valve may be mounted within the limited spacing directly adjacent the burner, minimizing unused space and an overall volume occupied by the burner system. No connector in the prior art permits this accomplishment.

Many additional features, advantages and a fuller understanding of the invention will be had from the accompanying drawings and the detailed description that follows. It should be understood that the above Summary of the Invention describes the invention in broad terms while the following Detailed Description of Preferred Embodiments describes the invention more narrowly and presents preferred embodiments which should not be construed as necessary limitations of the broad invention as defined in the claims.

DETAILED DESCRIPTION OF PREFERRED EMBODIMENTS

Figure 1:
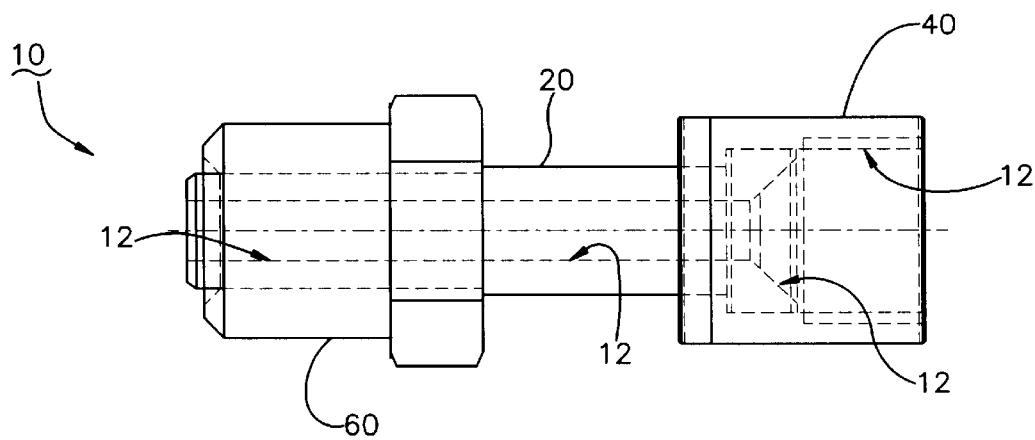
FIG. 1 is a plan view of a fluid fitting assembled in accordance with the present invention.
Figure 5:
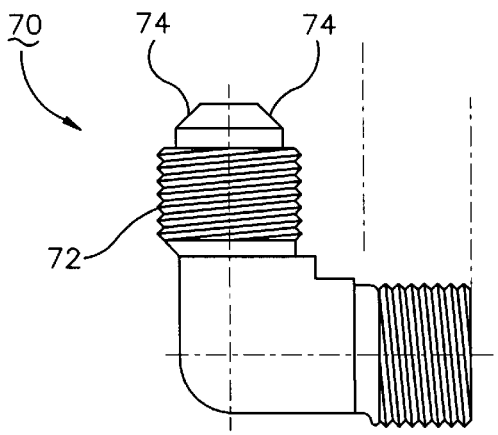
FIG. 5 is a perspective view of a 45° flare fitting to which the flare nut of FIG. 3A will be connected in accordance with the present invention.
Figure 6:
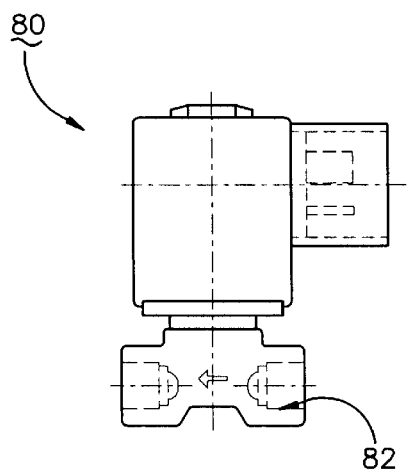
FIG. 6 is a plan view of a valve to which the plug fitting of FIG. 4A will be assembled in accordance with the present invention.

Referring to FIG. 1, the illustrated fluid fitting 10 is a connector assembly. The connector is utilized to connect a first member to a second member. The connector 10 includes an elongated tubular stem 20 inserted first through a first connecting member 40, and then through a second connecting member 60. The assembled fluid fitting 10 includes an internal passageway 12 through which fluid may pass. In the preferred embodiment, the first connecting member is a flare nut 40 and the second connecting member is a plug fitting 60. The flare nut 40 connects to a flare fitting 70, as shown in FIG. 5, and the plug fitting 60 connects to an internal fitting of a valve 80, as shown in FIG. 6. The connector 10 effects a hydraulic seal suitable for transmitting highly pressurized fluids. In the preferred embodiment, the first member is a flare fitting and the second member is a valve. The fuel oil is transmitted under pressure from a pump, through a valve to the connector 10, and to a flare fitting, which leads to a nozzle of an oil burner.

Figure 2A:
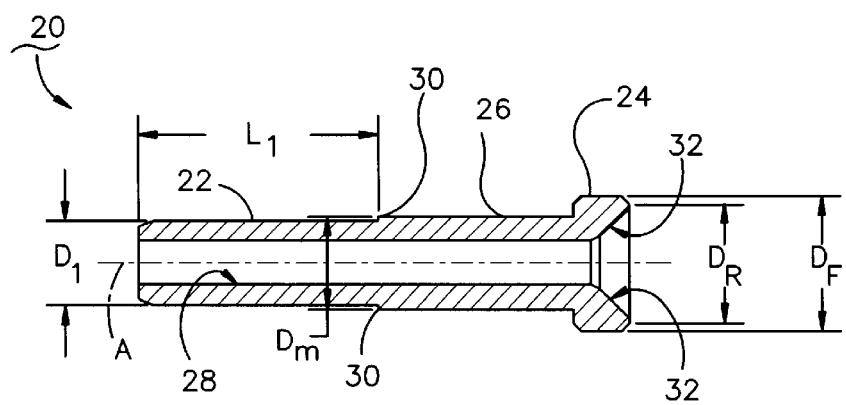
FIG. 2A is a vertical cross-sectional view of the elongated tubular stem shown in FIG. 1 as seen approximately from a plane taken along the lines 2A—2A of FIG. 2B.
Figure 2B:
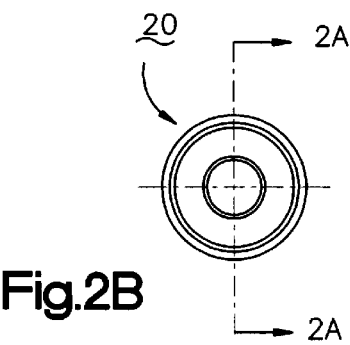
FIG. 2B is an axial view of the elongated tubular stem of FIG. 2A.

Referring to FIG. 2A, a vertical cross-sectional view of an elongated tubular stem 20 is shown as seen approximately from a plane taken along the lines 2A—2A of FIG. 2B. The elongated tubular stem 20 includes a first end portion 22, a flange 24 disposed at a second end portion of the stem, and an intermediate portion 26 axially spaced between the first end portion 22 and the flange 24. The first end portion has a first diameter $D_1$, while the flange has a diameter $D_f$, and the intermediate portion has a diameter $D_m$. As shown in FIG. 2A, the flange outer diameter $D_f$ is larger than the intermediate portion outer diameter $D_m$, while the diameter $D_m$ of the intermediate portion is larger than the first end portion outer diameter $D_1$. The first end portion 22 has a length $L_1$, which will be discussed in more detail later. In the preferred embodiment, the length $L_1$ is 0.590 inches.

An internal passageway 28 extends through the tubular stem 20 and offers a travel path for fluids. In the. preferred embodiment, fluid flows within the internal passageway 28 from the first end portion in the direction of the flange. A shoulder 30 is disposed between the intermediate portion 26 and the first end portion 22.

The internal passageway 28 expands in cross-sectional area within the flange 24. The flange 24 includes a flared exit orifice defined by a conical shaped mating surface 32. The orifice expands to an exit diameter $D_r$ larger than the diameter of the internal passageway 28. The exit orifice is formed by the conical surface 32 at an acute angle with respect to a longitudinal axis A of the tubular stem 20. In the preferred embodiment, the mating face 32 is angled at 45° with respect to the longitudinal axis A. It should be appreciated by those skilled in the art, that other angles may be used. As shown in FIG. 2A, the orifice diameter $D_r$ is less than the flange diameter $D_f$. In the preferred embodiment, the flange diameter Df is 0.330 inches while the orifice diameter $D_r$ is 0.282 inches.

Figure 3A:
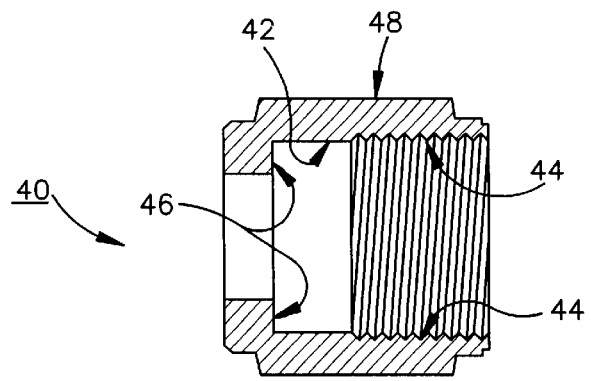
FIG. 3A is a vertical cross-sectional view of the flare nut shown in FIG. 1 as seen approximately from a plane taken along the lines 3A—3A of FIG. 3B.
Figure 3B:
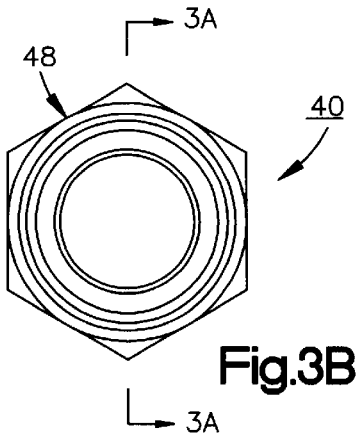
FIG. 3B is an axial view of the flare nut of FIG. 3A.

Referring to FIG. 3A, a vertical cross-sectional view of a first connecting member 40 is shown as seen approximately from.a plane taken along the lines 3A–3A of FIG. 3B. In the preferred embodiment, the first connecting member is a flare nut fitting 40. The flare nut 40 includes an inner opening 42 extending throughout the flare nut. During the assembly of the connector 10, the inner opening 42 receives the intermediate portion 26 of the tubular stem 20 and permits relative rotation between the flare nut 40 and the tubular stem 20. The first connecting member 40 includes a threaded portion 44 adapted to engage threads 72 of a first member 70, as shown in FIG. 5, to be connected to the first connecting member 40. In the preferred embodiment, the threads 44 are disposed on an internal surface of the flare nut 40. As shown in FIG. 3A, a portion of the inner opening 42 includes an internally threaded region 44.

An internal abutment surface 46 is included in the flare nut. As the first end portion 22 of the tubular stem 20 is inserted into the threaded section of the flare nut 40, the abutment surface 46 engages the flange 24 and prevents further axial movement of the flare nut 40 on the tubular stem 20. A polygonal shaped exterior tool engaging surface 48 is included. In the preferred embodiment, the engaging surface 48 forms a conventional-hexagon as shown in FIG. 3B.

Figure 4A:
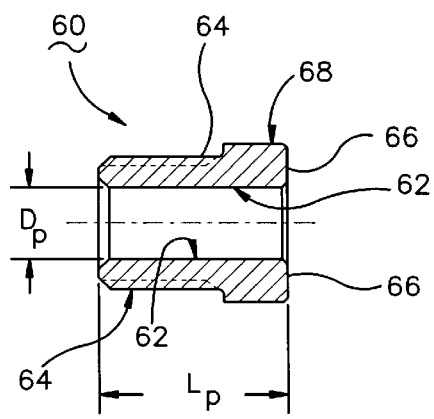
FIG. 4A is a vertical cross-sectional view of the plug fitting shown in FIG. 1 as seen approximately form a plane taken along the lines 4A—4A of FIG. 4B.
Figure 4B:
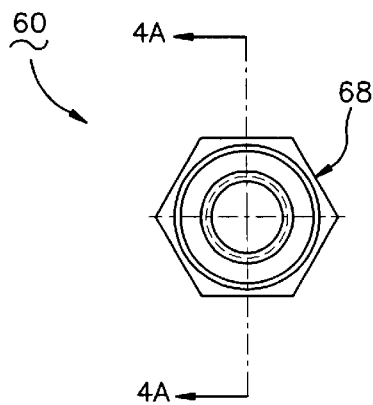
FIG. 4B is an axial view of the plug fitting of FIG. 4A.

Referring to FIG. 4A, a vertical cross-sectional view of a second connecting member 60 is shown as seen approximately from a plane taken along the lines 4A–4A of FIG. 4B. In the preferred embodiment, the second connecting member is a plug fitting 60. The plug fitting 60 includes an inner opening 62 extending throughout its length. The inner opening is defined by a diameter $D_p$. During the assembly of the connector 10, the inner opening 62 receives the first end portion 22 of the tubular stem 20. A hydraulic seal is effected by the interference fit wherein the internal diameter $D_p$ of the inner opening of the second connecting member is approximately the same as the diameter $D_1$ of the first end portion 22 of the elongated tube stem 20. The interference fit prohibits rotational movement between the plug fitting 60 and the tubular stem 20. In the preferred embodiment, the diameter $D_p$ of the inner opening is slightly less than the outer diameter $D_1$ of the tubular stem first end portion 22.

As shown in FIG. 4A, the diameter $D_p$ of the inner opening may range from 0.2000 to 0.2007 inches. As shown in FIG. 2A, the outer diameter $D_1$ of the first end portion may range from 0.2012 to 0.2017 inches. Therefore, the interference may range from a minimum of 0.0005 inches to a maximum of 0.0017 inches. It should be understood by those skilled in the art that the above ranges are exemplary and other minimum and maximum ranges of interference may be used.

The second connecting member 60 includes a threaded portion 64 adapted to engage threads 82 of a second member 80, as shown in FIG. 6, to be connected to the connector 10. In the preferred embodiment, the threads 64 are disposed on an external surface of the plug fitting 60. As shown in FIG. 4A, a portion of the plug 60 includes an externally threaded region 64.

An abutment face 66 at one end of the plug 60 engages the shoulder 30 of the tubular stem 20. The plug 60, includes a polygonal shaped exterior tool engaging surface 68. In the preferred embodiment, the engaging surface 68 forms a conventional hexagon as shown in FIG. 4B.

In the preferred embodiment, the axial length $L_1$ of the first end portion 22 is longer than the axial length $L_p$ of the plug fitting 60. As shown in FIG. 4A, the axial length $L_p$ of the plug 60 is 0.560 inches. The axial length $L_1$ of the first end portion 22 is 0.590 inches as shown in FIG. 2A. In other words, after the interference fit is made, the first end portion protrudes a certain distance, (e.g. 0.030 inches), beyond the plug fitting 60. It should be understood by those skilled in the art that the length of this protrusion is exemplary and may vary. The protrusion will be discussed in more detail later.

The connector 10 as described allows for a first member with a diameter to be connected to a second member with a diameter, where the diameter of the second member is larger than the diameter of the first member. No other similar interference fit type fluid fitting assembly in the prior art teaches this type of connection.

A method for assembling a fluid fitting in accordance with the present invention, suitable for connecting first and second members that contain pressurized fluid, includes several mechanical operational steps. The elongated tubular stem is provided in accordance with the present invention. The first connecting member according to the present invention is oriented such that the threaded portion of the first connecting member is directed toward the first end portion of the elongated stem. In the preferred embodiment, the first connecting member is a flare nut. The flare nut 40 is slipped over the first end portion 22 such that the flange 24 of the elongated stem contacts the internal abutment surface 46 of the flare nut 40.

The second connecting member is oriented such that the threaded portion of the second connecting portion is directed away from the first end portion of the elongated stem. In the preferred embodiment, the second connecting member is a plug fitting 60. The first end portion 22 is inserted into the interior opening of the plug fitting 60 such that abutment face 66 of the plug fitting 60 contacts the shoulder 30 of the elongated stem. Either a mechanical or hydraulic press with customized tooling may be used to perform the insertion. An interference fit is formed to effect a hydraulic seal. The connector 10 as assembled in accordance with the present invention is shown in FIG. 1.

The connection of the first and second members may be performed after the connector 10 assembly is complete. The threaded portion of the second connecting member is connected to a threaded portion of the second member. In the preferred embodiment, the second member is a standard threaded fitting 82 of a valve 80 as shown in FIG. 6. The external threaded portion 64 of the plug fitting 60 is connected to the internal threaded fitting 82 of the valve 80. An operator engages the polygonal shaped exterior tool engaging surface 68 to complete the connection. The plug fitting 60 is rotatably connected to the valve 80 under sufficient torque known in the art.

Figures 7A, 7B:
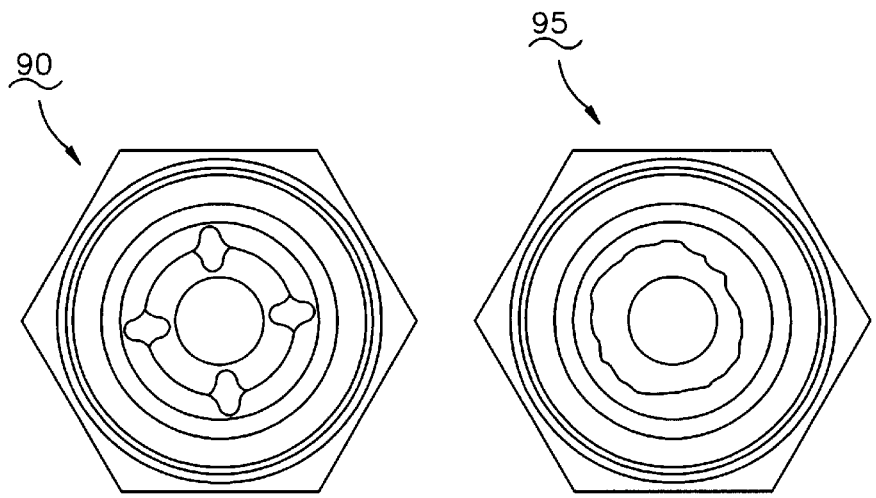
FIG. 7A is a perspective view of a fluid fitting assembled in accordance with the present invention after a staking method step has been performed on the plug fitting.
FIG. 7B is a perspective view of a fluid fitting assembled in accordance with the present invention after an alternative staking method step has been performed on the plug fitting.

Prior to connecting the connector assembly 10 to the valve 80, a staking operation may be performed to prevent the plug from moving off the stem. In a preferred embodiment, the protrusion of the first end portion 22 of the stem is staked, i e. deformed under force, into a tapered void in the plug fitting by the use of a tool. One possible resulting connection 90 is shown in FIG. 7A. In the preferred embodiment, a tool with a cross member resembling a Phillips head screwdriver is used to apply force to the protrusion. Alternatively, a rounded solid tool may be used, producing the circumferential style staked connection 95 shown in FIG. 7B. The staking operation provides an added security by restricting relative motion of the stem 20 with the plug 60, thus ensuring a fluid tight fitting. Other staking methods known to those skilled in the art may also be used.

The threaded portion of the first connecting member is connected to a threaded portion of the first member. In the preferred embodiment, the first member is a flare fitting as shown in FIG. 5. The internal threaded portion 44 of the flare nut 40 is connected to an external threaded portion 72 of the flare fitting 70. An operator engages the polygonal shaped exterior tool engaging surface 48 to complete the connection. The flare nut 40 is rotatably connected to the flare fitting 70 until the conical shaped mating surface 32 of the flare nut contact the conical shaped mating surface 74 of the flare fitting. After sufficient torque is applied to the polygonal shaped exterior tool engaging surface 48, a fluid tight seal is achieved. Neither a gasket nor any sealing material is required to achieve the fluid tight seal.

The hydraulic sealed connector been tested to pressures of 1000 psig. Further, UL specified pressure and torque tests have been performed. All test data indicates the connector effects an hydraulic seal. The results have been consistent using an elongated stem constructed of brass or steel, although other metals may be used.

The tool engaging surfaces 48, 68 allow the connector 10 to be connected to the first and second member within a limited volumetric space. Prior art connections have required repeated 360° rotation of the flare elbow fitting, which is eliminated in this connection method.

Figure 8:
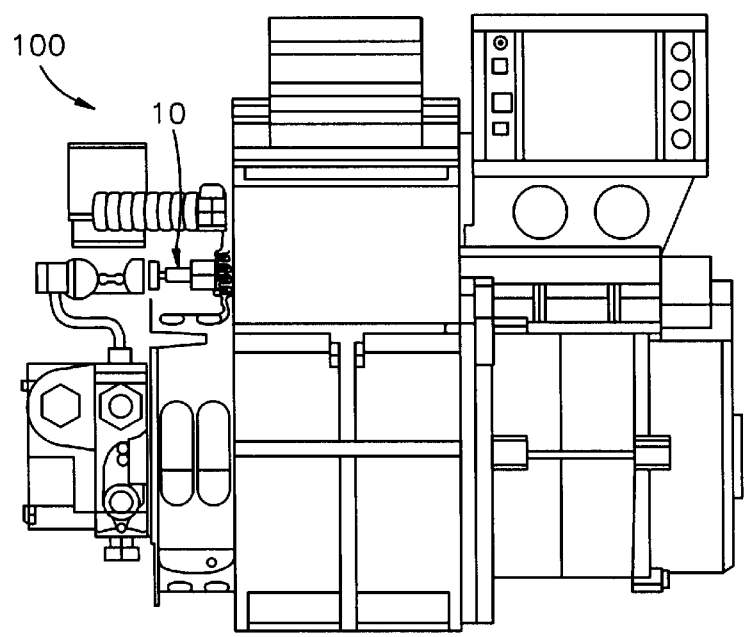
FIG. 8 is a perspective view of a burner assembly, including a connector, a valve, and a fuel conduit, constructed in accordance with the present invention.

The invention also comprises the combination of the valve connector, the valve and the flare fitting attached to a fuel conduit of a burner. Referring to FIG. 8, a burner assembly 100 comprising a burner, a valve connector 10, a first member, a second member, a fuel pump, and a fuel conduit is shown. In a preferred embodiment, the first member is a flare fitting. The flare fitting, which is the end of the inlet nozzle line of the burner, connects to the flare nut. The second member is a fuel control valve. The valve comprises two internal threaded connections. The valve connects the fuel conduit leading from a fuel pump on one end and to the plug fitting on the other end.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A fluid fitting for connecting first and second members that contain pressurized fluid, comprising:
   an elongated tubular stem comprising a first end portion having a first outer diameter, a flange having a second outer diameter and being disposed at a second end portion of said stem, an intermediate portion axially spaced between said first end portion and said flange and having an intermediate portion outer diameter, a shoulder between said intermediate portion and said first end portion and an internal fluid passageway extending through said stem, said second diameter being larger than said intermediate portion diameter and said intermediate portion diameter being larger than said first diameter;
   first connecting member comprising an inner opening extending therethrough that receives said intermediate portion of said stem and permits relative rotation between said first connecting member and said stem, an internal abutment surface that engages said flange and prevents axial movement of said first connecting member on said stem, a threaded portion adapted to engage threads of the first member to be connected to said fitting and a polygonal shaped exterior tool engaging surface; and
   a second connecting member comprising an inner opening extending therethrough which receives said first end portion of said stem, a threaded portion adapted to engage threads of the second member to be connected to said fitting, an abutment face at one end that engages said shoulder, and a polygonal shaped exterior tool engaging surface.

2. The fluid fitting of claim 1 comprising a hydraulic seal comprised by an internal diameter of said inner opening of said second connecting member and said first diameter being sized effective to form an interference fit between said connecting member and said first end portion.

3. The fluid fitting of claim 1 wherein said threaded portion of said first connecting member comprises threads disposed on an internal surface of said first connecting member and wherein said threaded portion of said second connecting member comprises threads disposed on an external surface of said second connecting member.

4. The fluid fitting assembly of claim 1 wherein an axial length of said first end portion is longer than an axial length of said second connecting member.

5. A method for assembling a fluid fitting assembly, suitable for connecting first and second members that contain pressurized fluid, the method comprising the steps of:
   providing an elongated tubular stem comprising a first end portion having a first outer diameter, a flange having a second outer diameter and disposed at a second end portion of said stem, an intermediate portion axially spaced between said first end portion and said flange and having an intermediate portion outer diameter, a shoulder between said intermediate portion and said first end portion and an internal fluid passageway extending through said stem, said second diameter being larger than said intermediate diameter and said intermediate diameter being larger than said first diameter;
   orienting a first connecting member, comprising an inner opening extending therethrough that receives said intermediate portion of said stem and permits relative rotation between said first connecting member and said stem, an internal abutment surface that engages said flange and prevents axial movement of said first connecting member on said stem, a threaded portion adapted to engage threads of the first member to be connected to said fitting and a polygonal shaped exterior tool engaging surface, such that said threaded portion of said first connecting member is directed toward said first end portion;
   slipping said first connecting member over said first end portion such that said flange contacts said internal abutment surface;
   orienting a second connecting member, comprising an inner opening extending therethrough which receives said first end portion of said stem, a threaded portion adapted to engage threads of the second member to be connected to said fitting, an abutment face at one end that engages said shoulder, and a polygonal shaped exterior tool engaging surface, such that said threaded portion of second connecting portion is directed away from said first end portion;
   inserting said first end portion into said interior opening of said second connecting member such that said second connecting member contacts said shoulder;
   connecting said threaded portion of said first connecting member to a threaded portion of said first member; and
   connecting said threaded portion of said second connecting member to a threaded portion of said second member.

6. The method of claim 5 comprising the step of inserting said first end portion into said interior opening of said second connecting member such that said second connecting member contacts said shoulder and forms an interference fit with said first end portion.

7. The method of claim 5 comprising the step of staking said first end portion of said stem onto a tapered end of said second connecting member.

8. A burner assembly having a fuel conduit delivery system comprising:

a first member;

a second member; and a fluid fitting for connecting said first and second members that contain pressurized fluid, comprising:

an elongated tubular stem comprising a first end portion having a first outer diameter, a flange having a second outer diameter and being disposed at a second end portion of said stem, an intermediate portion axially spaced between said first end portion and said flange and having an intermediate portion outer diameter, a shoulder between said intermediate portion and said first end portion and an internal fluid passageway extending through said stem, said second diameter being larger than said intermediate portion diameter and said intermediate portion diameter being larger than said first diameter;

a first connecting member comprising an inner opening extending therethrough that receives said intermediate portion of said stem and permits relative rotation between said first connecting member and said stem, an internal abutment surface that engages said flange and prevents axial movement of said first connecting member on said stem, a threaded portion adapted to engage threads of the first member to be connected to said fitting and a polygonal shaped exterior tool engaging surface; and a second connecting member comprising an inner opening extending therethrough which receives said first end portion of said stem, a threaded portion adapted to engage threads of the second member to be connected to said fitting, an abutment face at one end that engages said shoulder, and a polygonal shaped exterior tool engaging surface.

9. The burner assembly of claim 8 comprising a hydraulic seal comprised by an internal diameter of said inner opening of said second connecting member and said first diameter being sized effective to form an interference fit between said connecting member and said first end portion.

10. The burner assembly of claim 8 wherein said threaded portion of said first connecting member comprises threads disposed on an internal surface of said first connecting member and wherein said threaded portion of said second connecting member comprises threads disposed on an external surface of said second connecting member.

11. The burner assembly of claim 8 wherein an axial length of said first end portion is longer than an axial length of said second connecting member.

12. The burner assembly of claim 8 wherein the first member has an external threaded surface attached to a fuel conduit leading to an inlet nozzle of the burner.

13. The burner assembly of claim 8 wherein the second member is an internally threaded opening of a valve of the burner assembly attached to a fuel conduit.

14. The burner assembly of claim 10 wherein an outer diameter of said threaded portion of said second connecting member is larger than an inner diameter of said threaded portion of said first connecting member.

15. The burner assembly of claim 8 wherein said first member and second member are threaded fittings which form a part of the fluid delivery system of the burner assembly.

16. The burner assembly of claim 8 wherein said first end portion of said stem is staked onto an end of said second connecting member.

17. A burner assembly having a fuel conduit delivery system comprising:

a. a first threaded fitting;

b. a second threaded fitting; and c. a fluid fitting for connecting said first and second threaded fittings that contain pressurized fluid, comprising:

i. an elongated tubular stem comprising a first end portion having a first outer diameter, a flange having a second outer diameter and being disposed at a second end portion of said stem, an intermediate portion axially spaced between said first end portion and said flange and having an intermediate portion outer diameter, a shoulder between said intermediate portion and said first end portion and an internal fluid passageway extending through said stem, said second diameter being larger than said intermediate portion diameter and said intermediate portion diameter being larger than said first diameter;

ii. a first connecting member comprising an inner opening extending therethrough that receives said intermediate portion of said stem and permits relative rotation between said first connecting member and said stem, an internal abutment surface that engages said flange and prevents axial movement of said first connecting member on said stem, a threaded portion adapted to engage threads of said first threaded fitting to be connected to said fluid fitting and a polygonal shaped exterior tool engaging surface; and iii. a second connecting member comprising an inner opening extending therethrough which receives said first end portion of said stem, a threaded portion adapted to engage threads of the second threaded fitting to be connected to said fluid fitting, an abutment face at one end that engages said shoulder, and a polygonal shaped exterior tool engaging surface;

d. wherein the burner assembly comprising a hydraulic seal comprised by an internal diameter of said inner opening of said second connecting member and said first diameter of said stem, each diameter being sized effective to form an interference fit between said second connecting member and said first end portion.

e. wherein said first end portion of said stem is staked onto an end of said second connecting member.

* * * * *